United States Patent
Alonso et al.

(10) Patent No.: US 9,141,915 B2
(45) Date of Patent: Sep. 22, 2015

(54) METHOD AND APPARATUS FOR DERIVING DIAGNOSTIC DATA ABOUT A TECHNICAL SYSTEM

(71) Applicants: Siemens Aktiengesellschaft, Munich (DE); Siemens Energy, Inc., Orlando, FL (US)

(72) Inventors: Jose L. Alonso, DeBary, FL (US); Dieter Bogdoll, Muchen (DE); Siegmund Dull, Munich (DE); Glenn E. Sancewich, Cocoa, FL (US); Volkmar Sterzing, Neubiberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 332 days.

(21) Appl. No.: 13/754,291

(22) Filed: Jan. 30, 2013

(65) Prior Publication Data

US 2014/0214733 A1 Jul. 31, 2014

(51) Int. Cl.
*G06F 15/18* (2006.01)
*G06N 99/00* (2010.01)
*G06N 3/00* (2006.01)

(52) U.S. Cl.
CPC ............... *G06N 99/005* (2013.01); *G06N 3/00* (2013.01)

(58) Field of Classification Search
None
See application file for complete search history.

(56) References Cited

U.S. PATENT DOCUMENTS

2008/0071394 A1* 3/2008 Turner et al. ............... 700/31
2013/0116973 A1* 5/2013 Tackett ..................... 702/179

FOREIGN PATENT DOCUMENTS

WO 2007/131185 A2 11/2007 ............. G06N 99/00

OTHER PUBLICATIONS

Ji, Guo-rui, et al. "SVR-based soft sensor for effective wind speed of large-scale variable speed wind turbine." Natural Computation, 2008. ICNC'08. Fourth International Conference on. vol. 2. IEEE, 2008.*
Gonzaga, J. C. B., et al. "ANN-based soft-sensor for real-time process monitoring and control of an industrial polymerization process." Computers & Chemical Engineering 33.1 (2009): 43-49.*
Zhu, Zhanxing et al., "Local Linear Regression for Soft-Sensor Design with Application to an Industrial Deethanizer," 18$^{th}$ IFAC World Congress, URL: http://hompages.inf.ed.ac.uk/s1228056/publications/ifac2011.pdf, 6 pages, Sep. 2, 2011.
Sliskovic, Drazen et al., "Methods for Plant Data-Based Process Modeling in Soft-Sensor Development," Automatika, vol. 52, No. 4, URL: http://hrcak.srce.hr/index.php?show=clanak&id_clanak_jezik=116406, 13 pages, Dec. 31, 2011.
International Search Report and Written Opinion, Application No. PCT/EP2014/050225, 11 pages, May 26, 2014.

* cited by examiner

*Primary Examiner* — Kakali Chaki
*Assistant Examiner* — Daniel Pellett
(74) *Attorney, Agent, or Firm* — Slayden Grubert Beard PLLC (57) ABSTRACT

A method and apparatus for deriving diagnostic data about a technical system utilizing learning metrics gained by at least one data driven learning process while generating and updating soft sensor models of said technical system.

16 Claims, 5 Drawing Sheets

METHOD AND APPARATUS FOR DERIVING DIAGNOSTIC DATA ABOUT A TECHNICAL SYSTEM

TECHNICAL FIELD

The disclosure relates to a method and apparatus for deriving diagnostic data about a technical system such as a gas or wind turbine.

BACKGROUND

Complex technical systems and machines such as gas or wind turbines change their behaviour over time. Complex technical systems such as gas or wind turbines are governed by many complicated physical interrelationships that can often only be assessed by use of statistical methods since many values or parameters can only be roughly estimated. Conventional signal evaluations are not sufficient to maximize a turbine's life span and performance. By using so-called recurrent neural networks it is possible to depict the processes of a turbine and to make forecasts regarding its output. In particular, for maintenance purposes it is important to know not only what happened in the past but also how the processes of the technical system will continue in the future. By learning different situations the evaluation system can get better at independently forecasting which settings or decisions are required for a technical system such as a wind or gas turbine.

Monitoring and diagnostics for technical systems can be realized in different time scales. Up to now, simple monitoring functions can be handled by control systems of the technical system and these monitoring functions can comprise a comparison of measured values provided for instance by physical sensors to absolute limits or thresholds. Further, ratios between different measured values can be calculated compared to predetermined ratios. Moreover, it is possible to compare results of fixed formulas calculated by the control system to predetermined ranges. Complex and more accurate diagnostics are performed offline or on separate devices that only receive part of the operational data from the technical system.

Conventional control systems lack the resources to evaluate many complex models for all measured variables in real-time. Soft sensors learned from operational data can capture complex and nonlinear dependencies but need to be retrained regularly to keep their high accuracy. This retraining to account for the current system operation conditions however leads to the situation that small and continuous changes and degradations within the technical system are not detected anymore but learned as a changed system behaviour of the technical system. A conventional way to accurately detect fast as well as slow system changes in a technical system is the use of several monitoring models for one variable that are trained on different time scales. However, this again increases the computational load of the control system.

Another conventional way to accurately detect fast as well as slow system changes is the comparison of models on data of a long period such as months or years. However, accessing these old data also creates significant performance problems. Another issue is that a changed or updated system configuration or replacements of physical sensors can lead to different measurements, causing this approach to be impractical.

Accordingly, there is a need to provide a method and an apparatus for deriving reliable diagnostic data about a complex technical system which overcome the above-mentioned disadvantages and which are able to capture a complex system behaviour and accurately identify fast as well as slowly degrading components of the technical system.

SUMMARY

On embodiment provides a method for deriving diagnostic data about a technical system utilizing learning metrics gained by at least one data driven learning process while generating and updating soft sensor models of said technical system.

In a further embodiment, said derived diagnostic data is evaluated by an evaluation process run on a control system in real time to generate events.

In a further embodiment, said learning process and said evaluation process are performed asynchronously with respect to each other.

In a further embodiment, the gained learning metrics comprises training errors, test errors, gradient information, variances and statistical data gained by learning processes for soft sensor models of said technical system.

In a further embodiment, said soft sensor models comprise function approximators such as neural networks, or other regressors.

In a further embodiment, the derived diagnostic data and the gained learning metrics are stored in a database or other data storage of said control system.

In a further embodiment, each learning process comprises an initial training process to build a soft sensor model of at least one subsystem of said technical system and a sequence of follow-up retraining processes adapted to update the respective built soft sensor model.

In a further embodiment, data sets indicating an operation condition of at least one subsystem of said technical system are generated by physical sensors which form part of subsystems within said technical system, and the data sets are supplied to the soft sensor models of the respective subsystems to calculate results.

In a further embodiment, control signals which are adapted to control physical actors of subsystems of said technical system are generated on the basis of the calculated results output by the corresponding soft sensor models.

In a further embodiment, each data set received from physical sensors of said technical system is stored in the database or other data storage of said control system and split in a training data set and one or possibly multiple test data sets.

In a further embodiment, the soft sensor model is trained in a training process on the basis of the split training data set, and wherein training errors are produced and stored as learning metrics in the database of said control system.

In a further embodiment, training and/or test errors produced in a training process of a soft sensor model are compared with each other and/or with training and/or test errors produced by at least one previous training process within the learning process of the same soft sensor model to detect a changing behaviour of at least one corresponding subsystem within said technical system.

In a further embodiment, a changing behaviour of at least one subsystem within the technical system is detected based on absolute error limits, differences between errors, ratios between errors and predetermined error function values.

In a further embodiment, a detected critical changing behaviour of at least one subsystem of said technical system is output by said control system to a system operator or to a maintenance management system adapted to manage maintenance procedures for said technical system or to manufacturers of the affected subsystems of said technical system.

In a further embodiment, the learning metrics of multiple soft sensor models for different subsystems within said technical system are aggregated to detect subsystems with changing behaviour and to find root causes for said changing behaviour within said technical system.

In a further embodiment, the derived diagnostic data comprises system parameters of said technical system which are not measurable by physical sensors or for which no physical sensors are deployed in said technical system.

Another embodiment provides a control system for deriving diagnostic data about a monitored technical system, wherein said control system comprises physical processor cores to which soft sensor models are mapped, said soft sensor models being generated and updated in at least one learning process which is driven by data provided by a data flow engine, and wherein the diagnostic data about the monitored technical system is derived on the basis of learning metrics gained during said learning process.

In a further embodiment, the physical processor cores are integrated in a central computer or distributed over different computers connected to each other via a network.

In a further embodiment, each physical processor core comprises one or several virtual cores to which the soft sensor models are mapped and which are adapted to process the respective software sensor models.

In a further embodiment, the monitored technical system comprises a gas or wind turbine unit driving an electrical generator by means of a rotating shaft.

Another embodiment provides an apparatus for deriving diagnostic data about a technical system using learning metrics gained by at least one data driven learning process while generating and updating soft sensor models of said technical system.

BRIEF DESCRIPTION OF THE DRAWINGS

Exemplary embodiments will be explained in more detail below on the basis of the schematic drawings, wherein.

DETAILED DESCRIPTION

Some embodiments provide a method for deriving diagnostic data about a technical system utilizing learning metrics gained by at least one data driven learning process while generating and updating soft sensor models of said technical system.

In one embodiment of the method the derived diagnostic data is evaluated by an evaluation process run on a control system in real time to generate events.

In a further embodiment of the method the learning process and the evaluation process can be performed asynchronously with respect to each other.

In a further embodiment of the method the gained learning metrics can comprise training errors, test errors, gradient information, variances and statistical data gained by learning processes for soft sensor models of the technical system.

In a further embodiment of the method the employed soft sensor models comprise function approximators.

In one embodiment the function approximators are formed by neural networks.

In a further embodiment of the method the function approximators are formed by regressors.

In a further embodiment of the method the derived diagnostic data and the gained learning metrics are stored in a database of said control system.

In a further embodiment of the method the learning process comprises an initial training process to build a soft sensor model of at least one subsystem of said technical system and a sequence of follow-up retraining processes adapted to update the respective built soft sensor model.

In a further embodiment of the method data sets indicating an operation condition of at least one subsystem of said technical system are generated by physical sensors which form part of subsystems within said technical system.

In a further embodiment of the method the data sets are supplied to the soft sensor models of the respective subsystems to calculate results.

In a further embodiment of the method control signals which are adapted to control physical actors of subsystems of said technical system are generated on the basis of the calculated results output by the corresponding soft sensor models.

In a further embodiment of the method all data sets received from physical sensors of said technical system are stored in the database of said control system or in another data storage. The data can be split in a training data set and one or more test data sets.

In a further embodiment of the method the soft sensor model is trained in a training process on the basis of the split training data set, wherein training errors are produced and stored as learning metrics in the database of the control system.

In a further embodiment of the method the training and/or test errors produced in a training process of a soft sensor model are compared with each other and/or with training and/or test errors produced by at least one previous training process within the learning process of the same soft sensor model to detect a changing behaviour of at least one corresponding subsystem within the technical system.

In a further embodiment of the method a changing behaviour of at least one subsystem within the technical system is detected based on absolute error limits, differences between errors, ratios between errors and predetermined error function values.

In a further embodiment of the method a detected critical changing behaviour of at least one subsystem of said technical system is output by said control system to a system operator.

In a further embodiment of the method the detected critical changing behaviour of at least one subsystem of said technical system is output by the control system to a maintenance management system adapted to manage maintenance procedures for said technical system.

In a further embodiment of the method a detected critical changing behaviour of at least one subsystem of the technical system is output by said control system to manufacturers of the affected subsystems of said technical system.

In a further embodiment of the method the learning metrics of multiple soft sensor models for different subsystems within said technical system are aggregated to detect subsystems with changing behaviour and to find root causes for said changing behaviour within said technical system.

In a further embodiment of the method the derived diagnostic data comprises system parameters of said technical system which are not measurable by physical sensors.

In a further embodiment of the method the derived diagnostic data comprises parameters of the technical system for which no physical sensors are deployed within said technical system.

Other embodiment provide a control system for deriving diagnostic data about a monitored technical system,
wherein said control system comprises physical processor cores to which soft sensor models are mapped,
said soft sensor models being generated and updated in at least one learning process which is driven by data provided by a data flow engine,
wherein the diagnostic data about the monitored technical system is derived on the basis of learning metrics gained during said learning process.

In one embodiment of the control system the physical processor cores are integrated in a central computer.

In a further embodiment the physical processor cores are distributed over different computers connected to each other via a network.

In a further embodiment of the control system each physical processor core comprises one or several virtual cores to which the soft sensor models are mapped and which are adapted to process the respective soft sensor models.

In one embodiment of the control system the monitored technical system comprises a gas or wind turbine unit adapted to drive an electrical generator by means of a rotating shaft.

Other embodiments provide an apparatus for deriving diagnostic data about a technical system using learning metrics gained by at least one data driven learning process while generating and updating soft sensor models of said technical system.

Figure 1:
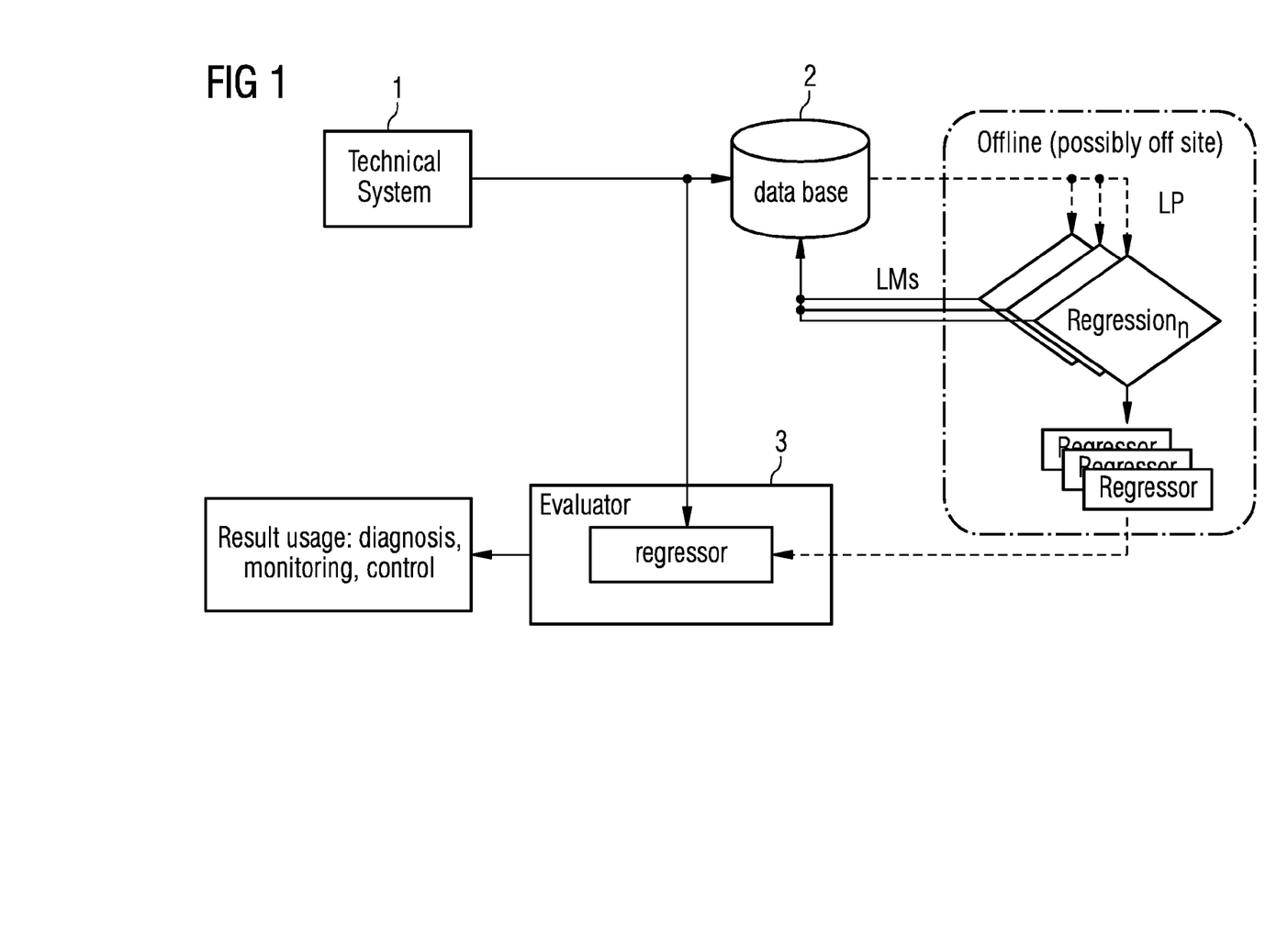
FIG. 1 shows a diagram for illustrating an example embodiment of a method for deriving diagnostic data about a technical system according to one embodiment.
Figure 2:
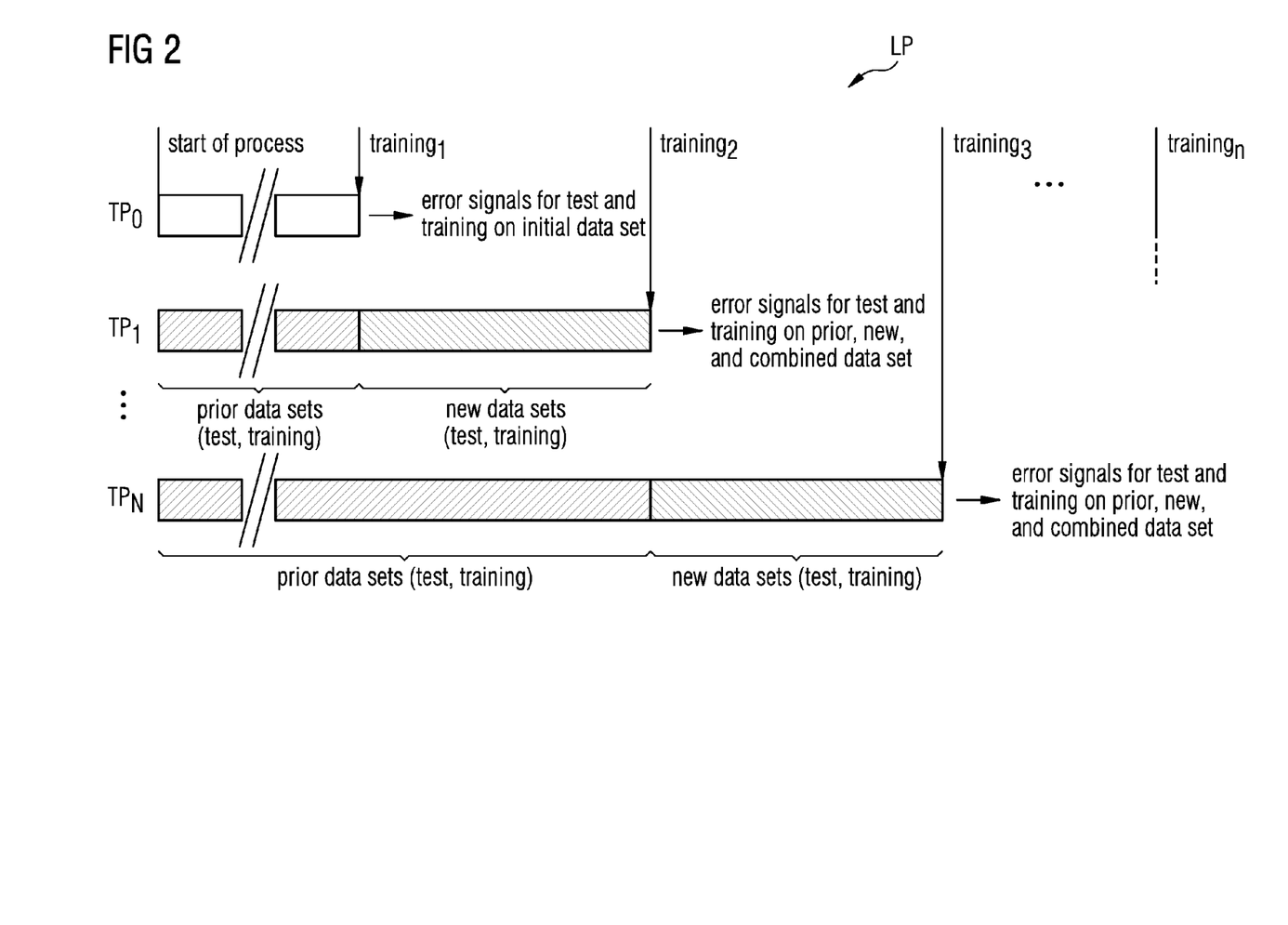
FIG. 2 shows a diagram for illustrating a learning process of a technical system as employed by the method and apparatus for deriving diagnostic data according to one embodiment.

As can be seen in FIG. 1 the technical system 1 can provide data to a database or a data storage 2. The technical system 1 can be a complex technical system comprising a plurality of components and subsystems. An example for a technical system 1 is a gas or wind turbine providing electrical energy to an electrical grid. A further example for a technical system 1 is a plant such as a power plant comprising a plurality of power plant components. For each subsystem or component at least one corresponding soft sensor model SSM can be provided. These soft sensor models SSM for the different components and subsystems of the technical system undergo a learning process LP which can comprise a sequence of training processes as illustrated in FIG. 2. An initial training process $TP_o$ can be provided to build a soft sensor model SSM of at least one subsystem of the technical system 1. A sequence of follow-up retraining processes $TP_i$ is adapted to update the respective build soft sensor model SSM. With the disclosed method learning metrics LM gained by the at least one data driven learning process LP while generating and updating the soft sensor models SSM of the technical system 1 utilized to derive diagnostic data about the technical system 1. The derived diagnostic data can then be evaluated by an evaluation process EP run on a control system in real time to generate events. The learning process LP and the evaluation process EP can in one embodiment be performed asynchronously with respect to each other.

As shown in FIG. 1 during commissioning of the technical system 1 or during regular operation of the technical system 1 data is generated for instance by physical sensors and can be stored in a database 2. In an offline process a SSM, e.g., a regressor is calculated based on the operational data sets read from the database 2. The successfully trained regressor is transferred to an Evaluator comprising a runtime module 3 such as T3000/AS3000 and executed by a processor. The results can be used for monitoring or a diagnosis or control applications as illustrated in FIG. 1. The evaluation of the trained regressor can happen onsite and on a control system hardware such as T3000/AS3000. As shown in FIG. 1 in addition to the offline regressor training cycle information from each training process such as error information is stored in the database 2 to be used by additional diagnostic or monitoring applications. The calculated regressions are stored in the database 2 as information about the performed regressor training. This information or data can be used for example for diagnosis and monitoring in conjunction with information from successive trainings. The regressions shown in FIG. 1 form learning metrics LM gained by the at least one data driven learning process LP while generating and updating soft sensor models SSM of the technical system 1. The soft sensor models SSM can comprise function approximators such as neural networks NN or other regressors. The derived diagnostic data and the gained learning metrics LM can be stored in the database 2 or in another data storage of the control system. The gained learning metrics $LM_s$ can comprise training errors, test errors, gradient information, variances and statistical data gained by learning processes LP for soft sensor models SSM of the technical system 1.

FIG. 2 illustrates a learning process LP of a technical system 1 or a subsystem of the technical system 1 can comprise an initial training process TP0 and several follow-up retraining processes TP1, TP ..., TPn.

The initial training process TP0 is provided to build a soft sensor model SSM of at least one subsystem of the technical system 1. The sequence of follow-up retraining processes TP1, TP2 ..., TPn is provided to update the respective built soft sensor model SSM of the respective subsystem.

Diagnostics for control of an operation condition of at least one subsystem of the technical system 1 can be generated by physical sensors attached to the subsystem. The physical sensors can form part of the subsystems within the technical system 1. Data sets are supplied to the soft sensor models SSM of the respective subsystems to calculate results.

Each data set received from the physical sensors of the technical system 1 can be stored in the database 2 or another data storage of the control system. Further, the data sets can be split in a training data set and one or possibly multiple test data sets. The soft sensor model SSM is trained in the training process TP on the basis of the split training data set. During this training process TP training errors are produced and can be stored as learning metrics LM in the database 2 of the control system.

As illustrated in FIG. 2 after the initial training process TP0 subsequential trainings are performed after at least one new data vector is available. Each new data set can be used for test or training within a test or training set. After the learning process LP, i.e. the sequence of training processes $TP_s$, is finished, test errors generated during said learning process LP and combined data set can be provided for further processing. After the training the new data sets can be added to the prior data set to be used as prior data sets in the next training step of the learning process LP.

The training and/or test errors produced in the training process TP of the soft sensor model SSM can be compared with each other and/or with training and/or test errors produced by at least one previous training process within the learning process LP of the same soft sensor model SSM to detect a changing behaviour of at least one corresponding subsystem or component within said technical system 1. The changing behaviour of the at least one subsystem within the technical system 1 can be detected based on absolute errors, differences between errors, ratios between errors and the output of a predetermined function that takes error values as arguments.

In one embodiment a detected critical changing behaviour of at least one subsystem of the technical system 1 is output by the control system to a system operator. Further, it is possible that a detected critical changing behaviour is output by the control system to a maintenance management system which is adapted to manage maintenance procedures for the technical system 1. In a still further implementation the detected critical changing behaviour can also be output to manufacturers of the affected subsystems of the technical system 1.

The soft sensor model SSM can be formed by a neural soft sensor model. Neural soft sensor models can be evaluated very fast in a time range of typically about 10 to 100 of milliseconds. By using a dedicated plug in to the control system it is possible to download soft sensor models SSM or soft sensor modules to the control system and to evaluate a high number of complex nonlinear soft sensor models SSM in real time on the control system. An evaluation of long-term trends does require database access to past data and is however not possible due to the performance costs. The neural soft sensor model can be trained and retrained in the background where computational resources are available. An automatic learning process consisting of training processes $TP_s$ can generate and update neural soft sensors and can be guided by status information. One of the information that is generated during the automatic learning process is the training error. After model building of the soft sensor SSM model during an initial period by means of the initial training process TP0 which can cover all operating points of the technical system 1 new data can lead to an overall reduction of the model error since a given dependency or dynamics can be more accurately fitted if more training data are available. If, however, the dynamics and behaviour of the technical system 1 changes, these new data leads to an increase of the training error since the soft sensor model SSM cannot produce two different outputs from the same input. If the increase of the model error exceeds a predetermined threshold, an alarm can be generated from the training process of a neutral network model not only from the deployed models.

If a test error and training error remain constant, the new data does not contain relevant information and shows stable system behaviour of the technical system 1. If both errors fall or diminish the new data does add information and proves the diagnostics model as expected. If, however, the training error increases given the new data changed dynamics or behaviour can be derived. This is the case even though the test error might fall further. If the training error increases for instance several times on new incoming data a system degradation warning and ultimately an alarm can be issued by the control system. The control system can for instance issue an automatically generated report by sending an email containing a graph of the soft sensor model outputs in comparison to the measured outputs to visualize the change in system behaviour outputs of older models or the reference models from the newly commissioned technical system 1 evaluated on the most recent data and added to the graph in appropriate colors. In one embodiment this report can be sent to an operator, or if the situation persists or even deteriorates, to an engineer at the manufacturer of the respective degrading subsystem or component of interest within the technical system 1.

Information provided by the trained model may be extended by using various signals generated by the neural training process of the soft sensor model SSM itself. When training a neural network on real world data the available data can be split into at least two subsets, i.e. training data and at least one test data set, also referred to as validation or generalization set.

The neural soft sensor model is then trained on the training set resulting in a training error signal. First, this signal can be compared to the training error signal produced during the training process of the last instance of the same soft sensor model. As the regression problem can be assumed to be the same for all independent retraining processes, a similar slightly lower training error signal is expected in a normal operation where a subsystem such as a turbine has not degraded. If, however, the component such as a turbine has somehow changed its behaviour, the training error of the soft sensor model SSM can rise. If the training error of the soft sensor model SSM exceeds a certain limit, this can result in a warning or alert and a notification. Besides the training signal, signals from the test sets as well as ratios of training to test errors can further be used as learning metrics LM to compare the training performance to previous training runs. Further, error signals generated within a single training run or training process TP can also be used.

Since the technical system 1 comprises a plurality of such systems, multiple soft sensor models SSM can be used to solve various diverse prediction problems with different components and subsystems within the technical system 1 and the corresponding results can be aggregated to detect slowly degrading subsystems or components reliably. In one embodiment the learning metrics $LM_s$ of multiple soft sensor models SSM for different subsystems within the technical system 1 are aggregated to detect subsystems with changing behaviour and to find root causes for the changing behaviour within the technical system 1.

The overall system can consist of a hierarchy, where most or all measured system variables are evaluated in the control system or in a multithreaded data flow engine such as Seneca by automatically learned soft sensor models that are capable to react fast to account for any implausible behaviour given that the driving variables are known. A differential alarm limit between the neural soft sensor models and the control system data can be evaluated for this fast detection loop. Parallel, but asynchronous, new data is set to a model update learning process. Using for instance data encapsulators or other data density models new data can be classified into known and unknown inputs. Adding known inputs to the training data and a fixed percentage of them to the test data leads to a reduction of both, the training error and the test error.

The data vector of available measurements and sensor readings can consist of thousands of variables which have to be processed at a fast rate of e.g. 1 Hz or faster. Several evaluations in parallel and in concert with each other are required to produce the results used by the control system. Since the number of variables and models can increase over time, the system is able to be scaled up where it is supported by more powerful computers with more processor cores. Each computation can be done within a virtual computer core without blocking parallel or independent computations. Taking into account the available hardware these virtual cores can be mapped to the available physical cores which can also be distributed over several computers.

In one embodiment a control system for deriving diagnostic data about the monitored technical system 1 is provided. This control system can comprise virtual processor cores to which soft sensor models SSM are assigned to. These soft sensor models SSM can be generated and updated in at least one learning process LP such as shown in FIG. 2 which is driven by data provided by a data flow engine DFE. The diagnostic data about the monitored technical system 1 is then derived on the basis of learning metrics LMS gained during the learning process LP. The virtual processor cores of the control system can be mapped to physical processor cores within one central computer. In an alternative embodiment the virtual processor cores of the control system can be mapped to physical processor cores distributed over different computers connected to each other via a data network.

Figure 3:
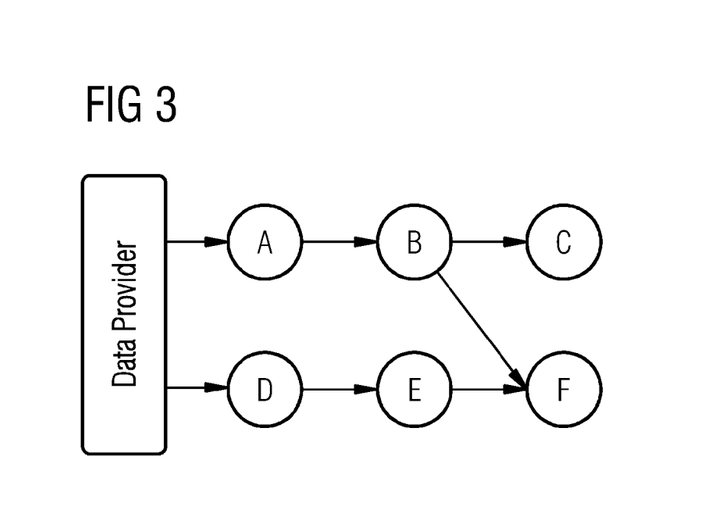
FIGS. 3 to 7 show diagrams for illustrating the operation of a control system for deriving diagnostic data according to another embodiment.
Figure 4:
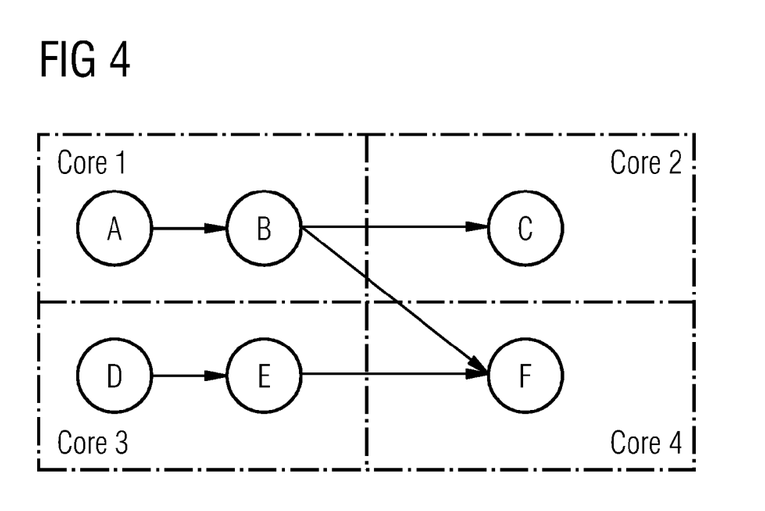
Figure 5:
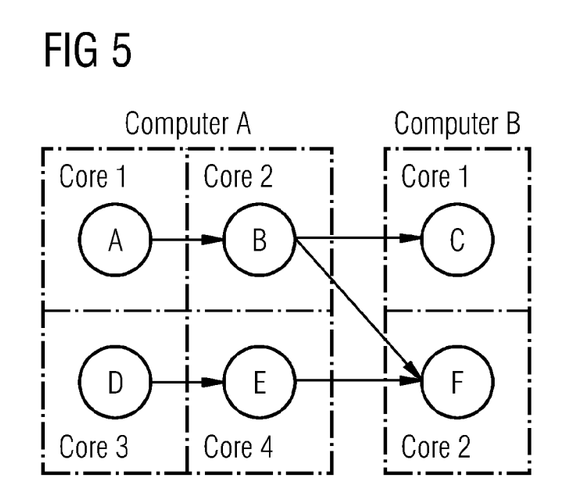
Figure 6:
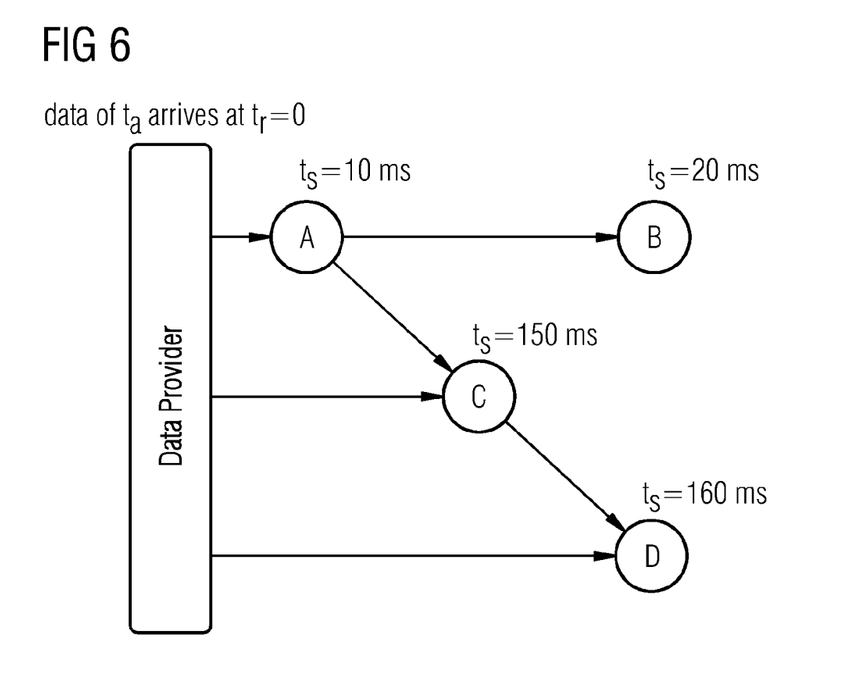
Figure 7:
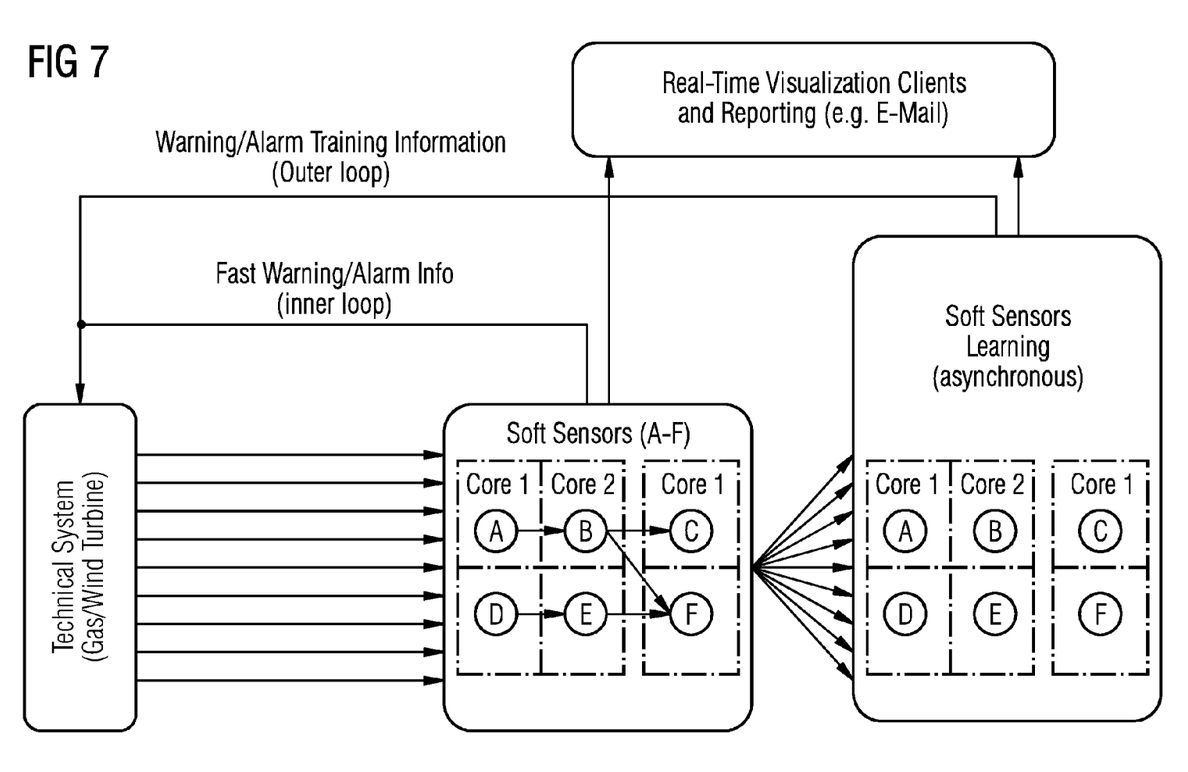

Each physical processor core can comprise one or several virtual cores to which the soft sensor models SSM can be mapped and which are adapted to process the respective soft sensor models as also illustrated by the examples of FIGS. 3 to 7. FIG. 3 shows an example of computational data flow. As shown in FIG. 4 if the computations (A,B) and (D,E) are highly coupled (each computation result of A/D triggers a computation within D/E) and together they don't utilize to more than 100%, then they should share that physical core. As shown in FIG. 5 if the computations A, B, D and E would utilize their own core to nearly 100%, they should get each its own physical core and the virtual cores C and F should be mapped to another computer. As shown in FIG. 6 data which are measured at plant time $t_a$ arrive at system $t_s=0$. In the shown example of FIG. 6 the processing time of nodes A, B and D are approximately 10 ms and the time of node C is about 150 ms. The dataflow has to be synchronized such that D is receiving data from the data provider and from node C with the same $t_a$ although $t_s$ is different. This synchronization does not delay other independent data flows, like for example the signal from node A to B. Even if the data rate is less than 160 ms a data $t_{a+1}$ does not overtake one from $t_{a+0}$.

To resolve root cause relationships it is important that data which are measured at a point of time are processed only with data samples of a compatible time frame regardless if other data comprise raw measurements or computed results. To fulfill these requirements a software platform design is provided which allows handling of thousands of variables with hundreds or thousands of concerted and parallel model evaluations in compatible time frames. With the disclosed method and apparatus it may be possible to detect effects that emerge slowly in the technical system 1. Slowly means in this context that for instance the evaluation cycle of a regressor is fast (one evaluation every T milliseconds or seconds), where the training is asynchronous and compared to the evaluation, the process is slower started every couple of minutes, hours or days).

In one embodiment of the method and apparatus neural soft sensor models are used for all system variables of the technical system 1. With the disclosed method and apparatus one does not only use the soft sensor models SSM after the training as, e.g., soft sensors, but one does also exploit the information and data generated during the learning process LP to recognize a changing system behaviour of the technical system 1, in particular a slowly degrading system behaviour. The exploited information comprises in particular the learning metrics $LM_s$ gained by at least one data driven learning process LP while generating and updating soft sensor models SSM of the technical system 1.

With the disclosed method and apparatus by use of soft sensor model errors provided by the learning process for a neural soft sensor it is possible to detect slowly changing system or system component behaviour and to plan system maintenance procedures accordingly. Thus, the fast and few computational resources required for evaluation of the neural soft sensor modules SSM or soft sensor models are complemented by a sensitive recognizing apparatus for slow system changes which does not require any additional resources and which operates within the cycle of the learning process LP.

A data flow engine DFE that permits to run the individual soft sensor models SSM on different processor cores or CPUs in parallel can perform the retraining of the soft sensors in the background on the same computer. The data flow engine can be configured to act like a single central system or as several distributed de-centralized systems. The data flow engine can run in both modes either collocated with the technical system or remotely to the technical system but connected via a network which transmits the sensor data. If the data are real-time forwarded to a central server, all computations can be performed in a centralized manner. This allows not only the evaluation against previous operational data and models of the technical system 1 but also a comparison against models, in particular soft sensor models SSM of other comparable technical systems. By using live data visualization different soft sensor models SSM can be applied on the live data stream to immediately show effects caused by changes in system behaviour of the technical system 1.

A further advantage of some embodiments is the utilization of the model-based soft sensor for the purpose of failure detection and accommodation. During an in-range failure of a redundant sensor there needs to be an accurate arbitrator to determine which physical sensor attached to the technical system is malfunctioning. Accordingly, in one implementation it is possible to utilize the model-based soft sensor as such an arbitrator so that the operation of the technical system 1 can be continued without interruption of the operation of the technical system 1.

In one implementation a data analysis tool can be used for visualization of both a model-based sensor and a physical sensor so that a corresponding data trend can be examined. A model deviation can yield near real time degradation of the physical technical system 1 by setting alarms based on model residuals. Furthermore, a long-term trend analysis of system models can be used for a condition-based maintenance of the physical technical system 1. This in turn does lead to a high availability of the physical technical system 1 which can operate without any interruptions.

In addition, engineering validation tasks can be performed using soft sensors. By virtual modification, e.g., by modifications of input parameters, changed prototype parts for subsystems and their expected behaviour can be simulated by a simulation tool. The gained knowledge or data can be used within the design process of the technical system 1 or its subsystems to cut time and costs and can be compared to installing prototype parts. In addition, design tools or engine parts can be refined to match current results and verify improvements using the diagnostic data provided by the disclosed method and apparatus.

The control system for deriving diagnostic data about a monitored technical system 1 can be used for any technical system where a learning process LP is employed. The machine learning process can use empirical data provided from sensors or databases. In one implementation the learning process LP can employ a neural network NN.

In other embodiments a technical system 1 is provided comprising a control unit or a control system for deriving diagnostic data about the monitored technical system 1. This control unit can comprise physical processor cores to which soft sensor models SSM are mapped wherein said soft sensor models SSM are generated and updated in at least one learning process LP which is driven by data provided by a data flow engine DFE. The diagnostic data about the monitored technical system 1 is derived by the control unit on the basis of learning metrics $LM_s$ gained during a learning process LP for one or several subsystems of the technical system 1. In one embodiment the technical system 1 is formed by a gas or wind turbine. By the control unit diagnostic data about the turbine is derived utilizing learning metrics $LM_s$ such as training errors, test errors, gradient information, variances and statistical data gained by the learning process LP of soft sensor models SSM of the turbine. These learning metrics $LM_s$ are gained by at least one data driven learning process LP while generating and updating the soft sensor models SSM of the turbine. The turbine can drive an electrical generator by means of a rotating shaft. The electrical generator can be connected to an electrical grid.

What is claimed is:

1. A method for deriving diagnostic data about a technical system, comprising:
   utilizing learning metrics gained by at least one data driven learning process while generating and updating soft sensor models of said technical system by a process including:
      receiving sensor data sets from physical sensors which form part of subsystems within said technical system, the sensor data indicating an operation condition of at least one subsystem of the technical system,
      storing received sensor data sets in a database and splitting the received sensor data sets into a training data set and one or more test data sets,
      using the training data set to perform a multiple-instance training process to train a particular soft sensor model corresponding to a particular subsystem of the technical system, the multiple-instance training process including (a) an initial training process instance to build the particular soft sensor model, and (b) a sequence of follow-up training process instances to update the particular soft sensor model,
      wherein each training process instance for the particular soft sensor model generates training errors and test errors,
      storing the training errors and test errors generated by each instance of the iterative training process as learning metrics in the database,
      for each follow-up training process instance, performing an error comparison to detect a changing behaviour of the particular subsystem of the technical system corresponding with the particular soft sensor model, wherein the error comparison comprises at least one of:
         (a) comparing the training errors and test errors generated by that training process instance with each other, or
         (b) comparing at least one of the training errors or test errors generated by that training process instance with at least one of the training errors or test errors generated by a previously completed training process instance, and
      automatically generating a notification of the detected changing behaviour of the particular subsystem.

2. The method according to claim 1 wherein said derived diagnostic data is evaluated by an evaluation process run on a control system in real time to generate events.

3. The method according to claim 2 wherein said learning process and said evaluation process are performed asynchronously with respect to each other.

4. The method according to claim 1 wherein the gained learning metrics comprises training errors, test errors, gradient information, variances and statistical data gained by learning processes for soft sensor models of said technical system.

5. The method according to claim 1 wherein said soft sensor models comprise function approximators such as neural networks, or other regressors.

6. The method according to claim 1 wherein the derived diagnostic data and the gained learning metrics are stored in a database or other data storage of said control system.

7. The method according to claim 1 wherein each learning process comprises an initial training process to build a soft sensor model of at least one subsystem of said technical system and a sequence of follow-up retraining processes adapted to update the respective built soft sensor model.

8. The method according to claim 1 wherein control signals which are adapted to control physical actors of subsystems of said technical system are generated on the basis of the calculated results output by the corresponding soft sensor models.

9. The method according to claim 1 wherein a changing behaviour of at least one subsystem within the technical system is detected based on absolute error limits, differences between errors, ratios between errors and predetermined error function values.

10. The method according to claim 9 wherein a detected critical changing behaviour of at least one subsystem of said technical system is output by said control system to a system operator or to a maintenance management system adapted to manage maintenance procedures for said technical system or to manufacturers of the affected subsystems of said technical system.

11. The method according to claim 1 wherein the learning metrics of multiple soft sensor models for different subsystems within said technical system are aggregated to detect subsystems with changing behaviour and to find root causes for said changing behaviour within said technical system.

12. The method according to claim 1 wherein the derived diagnostic data comprises system parameters of said technical system which are not measurable by physical sensors or for which no physical sensors are deployed in said technical system.

13. A control system for deriving diagnostic data about a monitored technical system, comprising:
   physical processor cores to which soft sensor models are mapped, said soft sensor models being generated and updated in at least one learning process which is driven by data provided by a data flow engine,
   the control system being configured to derive the diagnostic data about the monitored technical system based on learning metrics gained during said learning process by:
      receiving sensor data sets from physical sensors which form part of subsystems within said technical system, the sensor data indicating an operation condition of at least one subsystem of the technical system,
      storing received sensor data sets in a database and splitting the received sensor data sets into a training data set and one or more test data sets,
      using the training data set to perform a multiple-instance training process to train a particular soft sensor model corresponding to a particular subsystem of the technical system, the multiple-instance training process including (a) an initial training process instance to build the particular soft sensor model, and (b) a sequence of follow-up training process instances to update the particular soft sensor model,
      wherein each training process instance for the particular soft sensor model generates training errors and test errors,
      storing the training errors and test errors generated by each instance of the iterative training process as learning metrics in the database, for each follow-up training process instance, performing an error comparison comprising at least one of:
(a) comparing the training errors and test errors generated by that training process instance with each other, or
(b) comparing at least one of the training errors or test errors generated by that training process instance with at least one of the training errors or test errors generated by a previously completed training process instance, and derive diagnostic data about the particular subsystem of the monitored technical system based at least on the results of the error comparison.

14. The control system according to claim 13 wherein the physical processor cores are integrated in a central computer or distributed over different computers connected to each other via a network.

15. The control system according to claim 14 wherein each physical processor core comprises one or several virtual cores to which the soft sensor models are mapped and which are adapted to process the respective software sensor models.

16. The control system according to claim 13 wherein the monitored technical system comprises a gas or wind turbine unit driving an electrical generator by means of a rotating shaft.

* * * * *